Patented Dec. 6, 1938

2,139,375

UNITED STATES PATENT OFFICE 2,139,375

REMOVAL OF SO₂ FROM GASES

Russell W. Millar and Herbert P. A. Groll, Berkeley, Calif., assignors to Shell Development Company, San Francisco, Calif., a corporation of Delaware No Drawing. Application June 14, 1937, Serial No. 148,098

7 Claims. (Cl. 23—2)

This invention relates to a practical and economical process for the removal and recovery of sulphur-containing acidic gaseous components from gaseous or liquid mixtures containing one or a plurality of the same.

The invention also relates to and provides novel and useful compositions of matter comprising a sulphur-containing acidic gas or a plurality of such acidic gases dissolved in a solvent essentially comprising an ether, ester or mixed ether-ester of a polyhydric alcohol, which polyhydric alcohol derivative is normally liquid at ordinary temperatures and no molecule of which contains more than three directly linked carbon atoms devoid of oxygen atoms.

The process of the invention comprises extracting the sulphur-containing acidic gaseous component or components from a liquid or gaseous mixture by contacting said mixture by scrubbing or other efficient means with a liquid solvent essentially comprising or consisting of an ether, ester or mixed ether-ester of a polyhydric alcohol, which polyhydric alcohol derivative is normally liquid at ordinary temperatures and no molecule of which contains more than three di- directly linked carbon atoms devoid of oxygen atoms. Subsequent to the extraction operation, the liquid solvent containing the extracted gaseous component in solution is separated in any convenient manner from the liquid or gaseous raffinate, and either the solvent, the acidic gaseous component, or both solute and solvent, recovered by heating the solution to expel the absorbed gas, or by reducing the pressure whereby separation of the dissolved gas or gases is effected, or by a combination of these and/or the like procedures.

The invention provides an economically executed and highly efficient process for the extraction, concentration and recovery of sulphur-containing acidic gaseous components from fluid mixtures, particularly gaseous mixtures, containing the same. The term "sulphur-containing acidic gas" as used in this specification and the appended claims has a clear, definite and accepted meaning in the art to which the invention relates. The term includes, besides normally gaseous sulphur compounds which are acids per se such as hydrogen sulphide, methyl mercaptan, and the like, the gaseous sulphur-containing acid anhydrides such as sulphur dioxide and the like compounds. A preferred group of sulphur-containing gases which may be efficiently removed from gaseous or liquid mixtures in accordance with the process of the invention consists of hydrogen sulphide, methyl mercaptan and sulphur dioxide. Such sulphur-containing acidic gaseous components may be recovered from industrial or natural gas mixtures containing the same as coal gas, oil gas, water gas, natural gas, smelter gases and the like, as well as from their mixtures with gases such as air, nitrogen, gases of combustion, etc. The object may be to recover the acidic component or components, to purify the fluid mixture treated, or to recover the acidic component or components while at the same time purifying the treated fluid mixture thereby enhancing its value.

The efficiency of acidic gas recovery processes which comprise contact of the acidic gas-containing mixture with a selective solvent for the acidic gas or gases, as well as the purity of the recovered acidic gaseous component or components, is dependent, in general practice, upon the efficiency of the selective solving action of the solvent on the acidic component of the gaseous mixture treated, upon the chemical stability of the solvent at the temperature of absorption and release of the acidic gas, upon the boiling temperature of the solvent, and upon the difference between the vapor pressures of the liquid solvent and the vapor pressure of the solute at the temperature of the acidic gas recovery operation.

Numerous solvents have been proposed for use in acidic gas absorption processes. The proposed solvents may be divided into two general classes. The first class embraces solvents which are basic per se such as the amines, alkylolamines, and the like as well as aqueous solutions or suspensions of inorganic or organic basic-acting compounds. Such basic solvents absorb the acidic gases largely by direct chemical reaction therewith, the acidic gases being, in general, recovered and the solvent in part regenerated by reversal of the chemical absorption reaction as by boiling. The use of such basic-acting solvents alone is in many cases inefficient due to lack of solvent power of the solvent, the limited extent to which regeneration of the solvent can be effected, the great expenditure of thermal energy necessary to effect regeneration, and destruction of the equipment due to excessive corrosion attendant on their use. With some of the acidic gases, the use of such alkaline solvents is very undesirable.

The second group of acid gas solvents embraces those which are substantially neutral such as water and the neutral organic compounds. The liquid polyhydric ethers, esters and mixed ether-esters to which this invention relates are solvents of this group. Numerous neutral organic solvents, including alcohols, monohydric alcohol esters and natural fats and waxes, have been proposed as solvents for some of the acidic gases. The proposed solvents have failed to provide a practical and economical process for the recovery of acidic gases. The alcohols are unsuitable due to their relatively low solvent power for acidic gases; large volumes of the solvent must be handled, requiring equipment of great capacity and rendering recovery of the acidic gases from the solvent costly and inefficient. From a technical standpoint, the proposed monohydric alcohol esters are unsuitable either because of their relatively low boiling temperatures and high volatility at ordinary operating temperatures or because of their low solvent capacity. For example, ethyl acetate may be a fair solvent for some acidic gases, yet it cannot be used as a solvent therefor in an acid gas recovery process without excessive loss due to its high vapor pressure at ordinary temperatures. Ethyl acetate has an atmospheric boiling temperature of 77.4° C. and a vapor pressure of 76 mm. of Hg at 20° C. The novel sulphur-containing acidic gas solvents to which this invention relates, besides being superior to the monohydric alcohol esters as regards solvent power at ordinary temperatures, have relatively much higher boiling temperatures and practically negligible vapor pressures at ordinary temperatures. The lowest boiling aliphatic polyhydric alcohol ether (ethylene glycol monomethyl ether) boils at 124.3° C. and has a vapor pressure of only 7 mm. of Hg at 20° C. The lowest boiling polyhydric alcohol ester (ethylene glycol monoformate) boils at 180° C. and has a vapor pressure of less than 7 mm. of Hg at 20° C. Ethylene glycol monoethyl ether acetate, one of the lowest boiling mixed ether-esters of a polyhydric alcohol, boils at 153° C. and has a vapor pressure of 1.25 mm. of Hg at 20° C.

The proposed high boiling monohydric alcohol esters of dibasic acids, such as ethyl oxalate, ethyl phthalate, etc., have such a low solvent capacity for sulphur-containing acidic gases at ordinary or even reduced temperatures that their use is costly and impracticable.

The proposed natural fats and waxes are unsuitable solvents for sulphur-containing acidic gases. They have a very low solvent capacity for sulphur dioxide and the other sulphur-containing acidic gases, being much inferior to the members of our class of solvents in this as well as in other respects. The esters present in the natural oils and fats are the glycerides of long carbon chain fatty acids such as oleic, palmitic, etc., which glycerides contain a great number of directly linked carbon atoms devoid of oxygen. The solvents to which this invention relates are characterized by being normally liquid at ordinary temperatures and not possessing in their molecules more than three directly linked carbon atoms devoid of oxygen atoms. The natural waxes are for the most part fatty acid esters of monohydric alcohols. The natural fats and waxes are solids at ordinary temperatures; they must be dissolved in a solvent therefor and the resulting solution used as the acidic gas solvent. The solid esters are in themselves poor solvents because of their long hydrocarbon chains, and, in addition, the solvents for them, such as chlorbenzene, tetrachlorethane, amyl alcohol, etc., are in themselves poor acidic gas solvents and they possess the undesirable property of being quite volatile. The use of solutions of the solid fats and waxes results in materially decreased absorption capacity per unit volume of solvent employed thus requiring the handling of large volumes of absorbent solution, and requires the use of complex acid gas recovery systems. Since the vapor pressures of the suitable solvents for the solid fats and waxes are high at ordinary operating temperatures, costly and complicated recovery systems are necessary to avoid excessive losses of the volatile solvents.

The numerous disadvantages inherent in the known acidic gas recovery processes as applied to recovery of sulphur-containing acidic gases are overcome by the use of the members of the class of normally liquid polyhydric alcohol ethers, esters and mixed ether-esters herein defined. The members of this novel class of acidic gas solvents are normally liquid at ordinary temperatures, that is, at room temperature or temperatures of from about 20° C. to about 30° C.; they do not contain in their molecules more than three directly linked carbon atoms devoid of oxygen atoms; they are readily available; they are excellent solvents for sulphur-containing acidic gases; they are stable at all practical operating temperatures; they have relatively high boiling temperatures; and they have practically negligible vapor pressures at ordinary temperatures. Their use permits rapid and substantially complete absorption of the acidic gases in a relatively short time of contact while working with a minimum volume of solvent. The absorbed acidic gases are readily and substantially completely liberated from the solvents with a minimum expenditure of thermal energy, and, since the acidic gases are liberated in a substantially pure state, a minimum treatment is required to further purify them.

It is to be understood that the limitation as to the maximum number of directly linked carbon atoms devoid of oxygen atoms which an ether, ester or mixed ether-ester of a polyhydric alcohol may possess has been imposed solely for the purpose of defining in a clear and positive manner a preferred class of acid gas solvents all of which are operative in the process of the invention. We have found that the excellent absorptive power for sulphur-containing acidic gases of the normally liquid ethers, esters and mixed ether-esters of polyhydric alcohols is dependent upon the presence of certain oxygen-carbon groups in their molecules. All of the preferred solvents, of course, contain at least one ether group (C—O—C) or at least one ester group

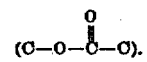

A mixed ether-ester contains at least one ether group and at least one ester group. In addition to the essential ether and/or ester groups, other oxygen groups, such as the carbinol group, the carbonyl group, the aldehyde group, and the like, may be present and favorably influence the solvent power of the solvent. We have found that of the polyhydric alcohol ethers, esters and mixed ether-esters having the same oxygen groups in their molecules, the ones having in their molecules the smallest number of directly linked carbon atoms devoid of oxygen atoms linked thereto possess the greatest absorptive capacity for acidic gases, which capacity progressively decreases as the number of directly linked carbon atoms devoid of oxygen atoms increases. The polyhydric alcohol ethers, esters and mixed ether-esters which are most effectively employed in accordance with the invention are those which are normally liquid at ordinary temperatures and no molecule of which contains more than three directly linked carbon atoms devoid of oxygen atoms.

The following are representative normally liquid polyhydric alcohol ethers of the class defined: ethylene glycol monomethyl ether, ethylene glycol monoethyl ether, the ethylene glycol monopropyl ethers, the ethylene glycol monobutyl ethers, ethylene glycol dimethyl ether, ethylene glycol diethyl ether, the ethylene glycol dipropyl and dibutyl ethers, the ethylene glycol mixed methyl-ethyl, methyl-propyl, methyl-butyl, ethyl-propyl, ethyl-butyl and propyl-butyl ethers, propylene glycol monomethyl ether, propylene glycol monoethyl ether, the propylene glycol monopropyl and monobutyl ethers, the propylene glycol dimethyl, diethyl, dipropyl and dibutyl ethers, the propylene glycol mixed methyl-ethyl, methyl-propyl, ethyl-propyl, propyl-butyl, and the like, the straight as well as branched chain butylene glycol monomethyl, dimethyl, monoethyl, diethyl, monopropyl, dipropyl, monobutyl, dibutyl, methyl ethyl, ethyl propyl, ethyl butyl, and the like ethers, the straight as well as branched chain amylene glycol mono- and di-methyl, ethyl, propyl and butyl ethers and the like and their homologues, analogues and suitable substitution products which are normally liquid at ordinary temperatures and no molecule of which contains more than three directly linked carbon atoms devoid of oxygen atoms.

The term "polyhydric alcohol ether" also comprehends the polyglycols, the polyglycol ethers, the polyglycerols, the polyglycerol ethers, etc. A polyglycol is a product of the condensation of a glycol with one or more molecules of the same or another species of glycol. The lowest polyglycol is diethylene glycol

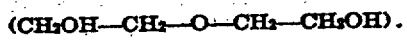

(CH₂OH—CH₂—O—CH₂—CH₂OH).

The following are representative polyglycols useful in the execution of our invention: diethylene glycol, triethylene glycol, dipropylene glycol, tripropylene glycol, the straight as well as branched chain dibutylene glycols, the tributylene glycols, the straight as well as branched chain diamylene glycols, the triamylene glycols, the mixed or asymmetrical polyglycols as ethylene propylene glycol, ethylene butylene glycol, propylene butylene glycol and the like and their homologues, analogues and suitable substitution products.

The following are representative polyglycol ethers: diethylene glycol monomethyl ether, diethylene glycol dimethyl ether, diethylene glycol monoethyl ether, diethylene glycol diethyl ether, the diethylene glycol mono- and di-propyl, butyl, methyl ethyl, methyl propyl, methyl butyl, ethyl propyl, and propyl butyl ethers, the triethylene glycol mono-, di- and mixed methyl, ethyl, propyl and butyl ethers, dipropylene glycol monomethyl ether, dipropylene glycol dimethyl ether, dipropylene glycol monoethyl ether, dipropylene glycol diethyl ether, the dipropylene glycol mono- and di- propyl and butyl ethers, the dipropylene glycol mixed methyl, ethyl, propyl and butyl ethers, the straight as well as branched chain di- and tributylene and amylene glycol mono-, di- and mixed methyl, ethyl, propyl and butyl ethers, and the like and their homologues, analogues and suitable substitution products which are normally liquid at ordinary temperatures and no molecule of which contains more than three directly linked carbon atoms devoid of oxygen atoms.

The following are representative polyhydric alcohol esters which are useful in the execution of the invention: ethylene glycol monoformate, ethylene glycol diformate, ethylene glycol monoacetate, ethylene glycol diacetate, ethylene glycol monopropionate, ethylene glycol dipropionate, ethylene glycol monobutyrate, ethylene glycol monoisobutyrate, the ethylene glycol dibutyrates, the ethylene glycol mixed formates, acetates, propionates and butyrates, propylene glycol monoformate, propylene glycol monoacetate, propylene glycol monopropionate, the propylene glycol monobutyrates, the propylene glycol di- and mixed formates, acetates, propionates and butyrates, the straight as well as branched chain butylene and amylene mono-, di- and mixed formates, acetates, propionates and butyrates, and the like and their homologues, analogues and suitable substitution products which are normally liquid at ordinary temperatures and no molecule of which contains more than three directly linked carbon atoms devoid of oxygen atoms.

The following are representative mixed ether-esters of polyhydric alcohols which are useful solvents in the execution of the invention: ethylene glycol monomethyl ether formate, ethylene glycol monomethyl ether acetate, ethylene glycol monomethyl ether propionate, ethylene glycol monomethyl ether butyrate, ethylene glycol monomethyl ether isobutyrate, ethylene glycol monoethyl ether formate, ethylene glycol monoethyl ether acetate, the ethylene glycol monoethyl ether propionates and butyrates, the ethylene glycol monopropyl, and butyl ether formates, acetates, propionates and butyrates, propylene glycol monomethyl ether formate, propylene glycol monoethyl ether formates, propylene glycol monoethyl ether acetate and the like, the normal and branched chain butylene and amylene glycol monomethyl, ethyl, propyl and butyl formates, acetates, propionates and butyrates, diethylene glycol monomethyl ether formate, diethylene glycol monoethyl ether formate, diethylene glycol monoethyl ether acetate, the diethylene glycol monopropyl, isopropyl, normal butyl, isobutyl, secondary butyl and tertiary butyl ether formates, acetates, propionates, and butyrates, the triethylene glycol monomethyl, ethyl, propyl and butyl ether formates, acetates, propionates and butyrates, the dipropylene glycol monomethyl, ethyl, propyl and butyl ether formates, acetates, propionates and butyrates, the dibutylene and diamylene glycol monomethyl, ethyl, propyl and butyl ether formates, acetates, propionates and butyrates, and the like and their homologues, analogues and suitable substitution products which are normally liquid at ordinary temperatures and no molecule of which contains more than three directly linked carbon atoms devoid of oxygen atoms.

Although the glycol ethers, esters and mixed ether-esters of the class of solvents to which this invention relates are in some cases preferred because they are more readily available, the invention is by no means to be regarded as restricted to the use of the ethers, esters and mixed ether-esters of dihydric alcohols. The following are representative of suitable ethers, esters and mixed ether-esters of higher polyhydric alcohols: glycerol monomethyl ether, glycerol dimethyl ether, glycerol trimethyl ether, the glycerol mono- and poly-methyl, ethyl, propyl and butyl ethers, the glycerol mixed methyl, ethyl, propyl and butyl ethers, diglycerol, the diglycerol mono-, poly- and mixed methyl, ethyl, propyl and butyl ethers, glycerol monoformate, glycerol diformate, glycerol triformate, glycerol monoacetate, glycerol diacetate, glycerol triacetate, diglycerol monoformate, the diglycerol polyformates, the diglycerol acetates, the diglycerol mixed formates and acetates, the glycerol ether-esters as glycerol monomethyl monoacetate and the like, the alpha-methyl glycerol methyl, ethyl and propyl ethers, the alpha-methyl glycerol formates and acetates, the beta-methyl glycerol methyl, ethyl, propyl and butyl ethers, the beta-methyl glycerol formates and acetates, erythritol monomethyl ether, erythritol dimethyl ether, erythritol monoformate, erythritol monomethyl ether acetate, and the like and their homologues, analogues and suitable substitution products which are normally liquid at ordinary temperatures and no molecule of which contains more than three directly linked carbon atoms devoid of oxygen atoms.

The stable higher boiling cyclic ethers of polyhydric alcohols, which ethers are normally liquid at ordinary temperatures and no molecule of which contains more than three directly linked carbon atoms devoid of oxygen atoms, are also contemplated as suitable solvents. Diethylene oxide (dioxane) is a representative member of this subgroup.

The following table gives the vapor pressures and atmospheric boiling temperatures of some readily available solvents for use in executing the process of the invention:

| Solvent | Vapor pressure*, mm. Hg | B. P. °C.* |
|---|---|---|
| Ethylene glycol diacetate | Less than 1 (30° C.) | 187 |
| Diethylene glycol diacetate | Less than 1 (30° C.) | 245 |
| 2-methoxy-butyl acetate | 3 (30° C.) | 154 |
| Ethylene glycol methyl ether acetate | 6 (30° C.) | 144 |
| Ethylene glycol ethyl ether acetate | 1.25 (20° C.) | 153 |
| Ethylene glycol butyl ether acetate | Less than 1 (30° C.) | 190 |
| Diethylene glycol methyl ether acetate | Less than 1 (30° C.) | 207 |
| Diethylene glycol ethyl ether acetate | Less than 1 (30° C.) | 216 |
| Diethylene glycol butyl ether acetate | Less than 1 (30° C.) | 247 |
| Ethylene glycol monomethyl ether | 7 (20° C.) | 124 |
| Ethylene glycol monoethyl ether | 3 (20° C.) | 135 |
| Ethylene glycol monoisopropyl ether | 8 (30° C.) | 142 |
| Ethylene glycol monobutyl ether | 2 (30° C.) | 167 |
| Diethylene glycol monomethyl ether | Less than 1 (30° C.) | 192 |
| Diethylene glycol monoethyl ether | Less than 1 (30° C.) | 196 |
| Diethylene glycol monobutyl ether | Less than 1 (30° C.) | 225 |
| Glycerol diacetate | 3 (20° C.) | 185 |
| Glycerol diethyl ether acetate | 4 (20° C.) | 210 |
| Diethylene glycol | 0.1 (20° C.) | 245 |

* Data taken from Ind. Eng. Chem., vol. 27, No. 10, pp. 1172-3, Durrans' Solvents (1930) and Carbide and Carbon Chem. Corporation's Synthetic Organic Chemicals, 7th ed., (1935). These authorities describe the listed compounds as liquids at room temperature.

The novel acidic gas solvents of the class herein defined may be used severally or in admixture with each other and/or other acidic gas solvents. In some cases, our solvents are advantageously used in conjunction with one or more of the known acidic gas solvents. For example, they may be used in conjunction with extraneous solvents such as aqueous solutions of bases, amines, alkylolamines and the like.

A convenient mode of operating the process of the invention to recover sulphur-containing acidic gases from gaseous mixtures comprises countercurrently contacting the gaseous mixture containing the acid gas or gases with the solvent consisting of or comprising a liquid polyhydric alcohol ether, ester or mixed ether-ester of the class herein described in a scrubbing tower containing plates or other suitable contact elements. The solvent, subsequent to its contact with the gaseous mixture, may be removed from the base of the tower with a predetermined acidic-gas concentration varying from a state of saturation downwards, depending upon the requirements of the particular operation and the results desired. The solvent may be recirculated through the scrubbing tower until the desired saturation point is reached, and then conducted to a suitable stripping column or columns for the recovery of the acid gas or gases and/or solvent. The solvent, partially or substantially free of the acid gas, may be recirculated. Alternatively, only part of the solvent may be sent to the stripping column while a predetermined portion is continuously recycled through the scrubbing tower with fresh solvent.

The following examples, which are included for purposes of illustration only and not intended to limit the invention, illustrate the solvent power of representative polyhydric alcohol ethers, esters and mixed ether-esters of the class herein defined for representative sulphur-containing acidic gases.

*Example I*

A gas mixture consisting of nitrogen and hydrogen sulphide and containing about 4% by volume of hydrogen sulphide was contacted with the respective solvents at about room temperature (25° C.) until the solvent was saturated with $H_2S$ at its partial pressure (0.04 atmosphere) in the inlet gas. The amount of $H_2S$ taken up by a liter of each solvent under these conditions is listed in the table:

*Table I*

| Solvent | Grams $H_2S$/liter solvent |
|---|---|
| Diethylene oxide | 1.2 |
| Diethylene glycol monoacetate | 1.0 |
| Ethylene glycol monoacetate | 0.8 |
| Ethylene glycol monoethyl ether | 1.0 |
| Ethylene glycol monoethyl ether acetate | 1.0 |
| Diethylene glycol monoethyl ether | .08 |

To demonstrate the superiority of the solvents of the class herein defined, and represented by the above members, over the glycols and high boiling monohydric alcohol esters, ethylene glycol and diethyl phthalate were tested under the same conditions as used for the attainment of the data above listed. The results of these tests are given below:

*Table II*

| Solvent | Grams $H_2S$/Liter solvent |
|---|---|
| Ethylene glycol | 0.3 |
| Diethyl phthalate | .7 |

*Example II*

A gas mixture consisting of nitrogen and sulphur dioxide and containing about 4% by volume of $SO_2$ was contacted with the separate solvents in the manner and under the same conditions as described in Example 1. The amount of $SO_2$ taken up per liter of solvent at 25° C. and atmospheric pressure is given in the following table:

Table III

| Solvent | Grams $SO_2$/Liter solvent |
|---|---|
| Diethylene oxide | 30 |
| Diethylene glycol | 16 |
| Ethylene glycol monoacetate | 18 |
| Ethylene glycol monoethyl ether | 20 |
| Ethylene glycol monoethyl ether acetate | 17 |
| Diethylene glycol monoethyl ether | 20 |

The following table lists the solubilities of $SO_2$ in water, ethylene glycol and various monohydric alcohol esters and some natural oils. These solubilities were obtained under the same conditions as were those listed in Table III.

Table IV

| Solvent | Grams $SO_2$/liter solvent |
|---|---|
| Water | 5.2 |
| Ethylene glycol | 8.0 |
| Diethyl oxalate | 12.0 |
| Diethyl malonate | 13.0 |
| Diethyl phthalate | 8.0 |
| Cottonseed oil | 6.0 |
| Sardine oil | 4.0 |

Comparison of the data of Tables III and IV shows that the members of the class of polyhydric alcohol ethers, esters and mixed ether-esters used in the execution of this invention are decidedly superior to known solvents for acidic gases such as water, polyhydric alcohols, monohydric alcohol esters and natural oils.

*Example III*

It was found that the solubility figures for methyl mercaptan in the various normally liquid polyhydric alcohol ethers, esters and mixed ether-esters to which this invention relates fall between the solubility figures of hydrogen sulphide and sulphur dioxide in the same solvents.

Three separate gaseous mixtures consisting, respectively, of 4% by volume of $H_2S$ in nitrogen, 4% by volume of $CH_3SH$ in nitrogen, and 4% by volume of $SO_2$ in nitrogen were separately scrubbed with the various solvents at about 25° C. in substantially the same manner as described in detail in Example I. The amount of the sulphur-containing acidic gases dissolved by the solvents at 25° C. and atmospheric pressure is shown in the following table:

| Solvent | Grams acidic gas/liter of solvent | | |
|---|---|---|---|
|  | $H_2S$ | $CH_3SH$ | $SO_2$ |
| Ethylene glycol monoacetate | 0.8 | 4.0 | 18.0 |
| Ethylene glycol monoethyl ether acetate | 1.0 | 4.6 | 17.0 |
| Diethylene oxide | 1.2 | 11.0 | 30.0 |
| Diethylene glycol | 1.0 | 2.7 | 16.0 |
| Ethylene glycol monoethyl ether | 1.0 | 3.6 | 20.0 |
| Diethylene glycol monoethyl ether | .8 | 3.7 | 20.0 |

Following the absorption of the sulphur-containing acidic gaseous component in the normally liquid polyhydric alcohol ether, ester or mixed ether-ester, the acidic gaseous component or components need not be separated from the solvent at once or shortly thereafter. The solutions of the sulphur-containing acidic gases, such as hydrogen sulphide, sulphur dioxide, methyl mercaptan and the like, in the polyhydric alcohol ether, esters and mixed ether-esters which are normally liquid at ordinary temperatures and no molecule of which contains more than three directly linked carbon atoms devoid of oxygen atoms are novel, valuable and useful compositions of matter. Such novel compositions may be stored and shipped as such and the sulphur-containing acidic gaseous component or components recovered therefrom when and as desired. In many cases, if desired, reactions of the absorbed gases with other reagents to obtain useful products may be effected in the solvent in which the extracted acid gas is dissolved. Such reactions are many times more easily controlled when carried out in an inert medium such as our novel solvents provide. In other cases, the use of the absorbent solution as a diluting media for the further reactions of the dissolved acid gas offers material advantages in that the step of distilling the absorbed acid gas from the solvent need not be resorted to.

This application is a continuation-in-part of our application, Serial No. 678,058, filed June 28, 1933 and which issued as U. S. Patent 2,086,731 on July 13, 1937.

As many apparent and different embodiments of this invention may be made without departing from the spirit thereof, it is to be understood that we do not limit ourselves to the foregoing examples or descriptions except as indicated in the following claims.

We claim as our invention:

1. A process for the removal of sulphur dioxide from gaseous mixtures containing the same which comprises the step of scrubbing the gaseous mixture with a liquid solvent essentially comprising a glycol ether, which is normally liquid at ordinary temperatures and no molecule of which contains more than three directly linked carbon atoms devoid of oxygen atoms.

2. A process for the removal of sulphur dioxide from gaseous mixtures containing the same which comprises the step of scrubbing the gaseous mixture with a liquid solvent essentially comprising a glycol ester which is normally liquid at ordinary temperatures and no molecule of which contains more than three directly linked carbon atoms devoid of oxygen atoms.

3. A process for the removal of sulphur dioxide from gaseous mixtures containing the same which comprises the step of scrubbing the gaseous mixture with a liquid solvent essentially comprising a glycol ether-ester which is normally liquid at ordinary temperatures and no molecule of which contains more than three directly linked carbon atoms devoid of oxygen atoms.

4. A process for the removal of sulphur dioxide from a gaseous mixture containing the same which comprises the step of scrubbing the gaseous mixture with a liquid solvent essentially comprising a compound of the class consisting of the ethers, esters and mixed ether-esters of polyhydric alcohols, which polyhydric alcohol derivatives are normally liquid at ordinary temperatures and no molecule of which contains more than three directly linked carbon atoms devoid of oxygen atoms.

5. A process for the removal of sulphur dioxide from a fluid mixture containing the same which comprises the step of extracting the fluid mixture with a liquid solvent essentially comprising a compound of the class consisting of the ethers, esters and mixed ether-esters of poly-hydric alcohols, which poly-hydric alcohol derivatives are normally liquid at ordinary temperatures and no molecule of which contains more than three directly linked carbon atoms devoid of oxygen atoms.

6. A process for the removal of sulphur dioxide from a gaseous mixture containing the same which comprises the step of scrubbing the gaseous mixture with a liquid solvent essentially comprising ethylene glycol monoacetate.

7. A process for the removal of sulphur dioxide from a gaseous mixture containing the same which comprises the step of scrubbing the gaseous mixture with a liquid solvent essentially comprising ethylene glycol monoethyl ether.

RUSSELL W. MILLAR.
HERBERT P. A. GROLL.

CERTIFICATE OF CORRECTION.

Patent No. 2,139,375.          December 6, 1938.

RUSSELL W. MILLAR, ET AL.

It is hereby certified that error appears in the printed specification of the above numbered patent requiring correction as follows: Page 4, second column, line 52, Table 1, for ".08" read 0.8; and that the said Letters Patent should be read with this correction therein that the same may conform to the record of the case in the Patent Office.

Signed and sealed this 21st day of March, A. D. 1939.

Henry Van Arsdale.

(Seal)                                         Acting Commissioner of Patents.

prising a compound of the class consisting of the ethers, esters and mixed ether-esters of poly-hydric alcohols, which poly-hydric alcohol derivatives are normally liquid at ordinary temperatures and no molecule of which contains more than three directly linked carbon atoms devoid of oxygen atoms.

6. A process for the removal of sulphur dioxide from a gaseous mixture containing the same which comprises the step of scrubbing the gaseous mixture with a liquid solvent essentially comprising ethylene glycol monoacetate.

7. A process for the removal of sulphur dioxide from a gaseous mixture containing the same which comprises the step of scrubbing the gaseous mixture with a liquid solvent essentially comprising ethylene glycol monoethyl ether.

RUSSELL W. MILLAR.
HERBERT P. A. GROLL.

CERTIFICATE OF CORRECTION.

Patent No. 2,139,375.                                December 6, 1938.

RUSSELL W. MILLAR, ET AL.

It is hereby certified that error appears in the printed specification of the above numbered patent requiring correction as follows: Page 4, second column, line 52, Table 1, for ".08" read 0.8; and that the said Letters Patent should be read with this correction therein that the same may conform to the record of the case in the Patent Office.

Signed and sealed this 21st day of March, A. D. 1939.

Henry Van Arsdale.

(Seal)                                                      Acting Commissioner of Patents.